Patented May 31, 1938

2,119,030

UNITED STATES PATENT OFFICE 2,119,030

PREPARATION OF LATEX FROM RUBBER-PRODUCING PLANTS

David Spence, Carmel, Calif.

No Drawing. Application June 8, 1935,
Serial No. 25,681

8 Claims. (Cl. 18—49)

This invention relates to an improved process for the extraction and preparation of rubber from various rubber-bearing shrubs, vines and other plants which do not lend themselves to the customary methods of tapping for the extraction of the rubber therein. It is generally applicable to the extraction of rubber from plants of the type referred to and to the preparation of improved products therefrom. It is particularly applicable to the treatment of guayule and products derived therefrom, and it will be more particularly described, therefore, in connection therewith.

Various methods have been proposed for the extraction of the rubber from those rubber-producing plants from which for one reason or another true rubber cannot be advantageously extracted as latex by tapping. Among these proposals is the method of extracting the rubber by means of solvents. Such solvent-extraction processes have actually been employed in the commercial preparation of rubber from guayule. They are too expensive, however, in comparison with the now universal practice of mechanical milling of the dried plant whereby the rubber is separated from the plant in the form of solid particles of rubber (known as "worms") and collected by flotation from water. Thus, this simple mechanical method of extraction has long since superseded solvent-extraction processes and is now universally employed where the preparation of rubber from guayule and such like is concerned.

In the course of years of experience in the commercial employment of this mechanical extraction process as at present employed for the extraction of rubber from guayule, it has been found necessary first to dry the shrub by sunning it in the field, or otherwise, before milling and today, both here and in Mexico, where the shrub abounds, this practice is universal. The shrub, after being gathered, is first subjected to a regulated period of sunning or drying which varies from time to time and from place to place. This sunning or drying of the shrub before mechanical milling is not merely to reduce the transport of superfluous water but is necessary in order to avoid loss of yield in the rubber recovered. Thus I find in the guayule industry today such expressions as "prime condition", "over-sunned", and "under-sunned" applied to the shrub as it appears for crushing and milling, and the endeavor is to subject all shrubs gathered to a rapid drying-out or desiccation process before milling in order, as far as possible, to obtain maximum yield and quality of recoverable rubber.

In the subsequent treatment of the shrub, the dried-out material is crushed between rolls in the presence of water, and the crushed material is then fed continuously and immediately to ball-mills or continuous-feed tube-mills where the crushed mass is ground by the action of flint pebbles. In this way the finely dispersed particles of rubber throughout the plant structure are made to unite by the rubbing action and pressure of the pebbles into particles about the size of a small pea, known in the trade as "worms", which are subsequently recovered by flotation and skimming from the surface of settling tanks containing fresh water.

It is a well known fact that the rubber produced by this mechanical extraction process varies greatly, not only in yield but particularly in quality and composition. Even with the shrub in so-called "prime condition" for milling after drying, as above explained, variations occur both as to yield and especially as to composition and quality of the resulting rubber product. On account of the constantly varying conditions required for effective and uniform drying before milling, great variations occur in the composition and quality of the recovered rubber and in losses of rubber brought about by more or less ineffective drying and milling.

As the success of the present-day process depends on the agglomeration of the rubber in the plant, brought about by drying of the same and subsequent milling, it is not surprising that the resulting rubber varies both in composition and quality according to the conditions of treatment of the shrub. It is well known that the rubber itself in guayule shrub deteriorates very rapidly when over-exposed to light and air in a more or less dry condition. Similarly, in agglomerating the rubber, various impurities find their way into and become dissolved or embedded mechanically in the same. Thus it is that guayule rubber prepared from the shrub by the present-day mechanical process of extraction seldom contains less than twenty per cent. (20%) of acetone-soluble impurities, together with several per cent. of vegetable protein, the usual figure for the acetone-extract of commercial guayule rubber being about twenty-five per cent. (25%) to twenty-seven per cent. (27%) of the weight of the dry rubber. Similarly, other impurities, such as fine particles of plant fibre (bagasse) and sand (from the flint pebbles), etc., find their way into and become bound up in the rubber. Subsequent washing of the "worms" or rubber before drying may be more or less effective in removing these mechanically entrained impurities, but the extent to which such washing treatment is effective depends largely on the prior treatments of drying and milling of the shrub. The acetone-extract of the rubber, on the other hand, is not appreciably reduced by final washing of the rubber. Thus it is that great variations occur in the composition, cleanliness and quality of the rubber produced by the mechanical process of extraction in its present form.

I have discovered that it is possible to extract the rubber from guayule and such like materials by mechanical means whereby many of the difficulties incidental to present practice may be simply overcome, resulting in a product of greatly increased purity and cleanliness and of superior quality both before and after vulcanization.

I have found, namely, that by completely reversing present-day methods in practice of desiccating or otherwise drying the plants in order to agglomerate the fine particles of rubber therein during crushing and milling, adopting instead conditions throughout to maintain or bring about a complete dispersion of the finely divided particles of rubber within the cells of the plant, it is possible to separate more or less completely the rubber from the other constituents in the form of a milky dispersion, which can be subsequently treated and coagulated by the various means well known in the art of latex treatment and handling.

For the complete mechanical separation of the rubber in the form of a latex dispersion, I have found that the various steps can best be carried out in the presence of water maintained at the same hydrogen ion concentration as that of the fresh juice of the plant itself. Such juice has a tendency to develop acidity, and the aqueous treatment liquid should be maintained neutral or, preferably, even slightly alkaline, in order to neutralize any acidity developed in the juice. In the case of guayule, I have found that a pH of not less than 7.2 is satisfactory and by crushing and milling the shrub in the presence of a buffer solution of not less than this pH, it is possible to prevent completely the formation of any large particles of rubber or "worms". Ninety per cent. (90%), more or less, of the total rubber present in the guayule shrub, by analysis, can be readily recovered in this way as a milky latex dispersion, of greenish color in the case of fresh shrub.

I have further found that by the use of suitable emulsifying agents in water alone or, better, in conjunction with a buffer solution of predetermined pH as above, shrub which has already more or less dried out and in which the rubber has therefore more or less coagulated can be similarly treated, the rubber therein being completely separated by mechanical treatment as a latex dispersion.

By mechanically separating the rubber as a latex dispersion from the body of the plant in this way, it is possible effectively to eliminate from the resulting rubber the objectionable impurities always associated, in greater or less amount, with the commercial product of present-day practice and to produce a rubber of uniform high-grade quality, absolutely free from particles of bagasse, sand and such like, and having an acetone extract ranging between five per cent. (5%) and eight per cent. (8%), more or less, depending on variations in treatment, this being comparable with that of plantation rubber, which approximates two-and-one-half per cent. (2½%) to four per cent. (4%).

The dilute latex obtained by the milling of the shrub under these conditions can be readily filtered. It will remain uncoagulated for a long period of time. In settling tanks the fine particles of sand, bagasse, and such like quickly settle out and can be completely separated before the latex is coagulated. On standing, this latex will gradually "cream", much more rapidly, however, on standing after just acidifying. Or the latex may be concentrated and at the same time freed from the last trace of bagasse or other water-insoluble impurities by other means, such, for example, as centrifuging.

In order to effect a quantitative separation of the latex rubber from the bagasse and other materials of milling, the bagasse must be washed or remilled with fresh liquor, and for continuous operation I use such wash liquors for the subsequent extraction of fresh shrub.

The latex dispersion prepared from guayule shrub in this way is a novel and remarkably interesting product. Under the microscope it will be found to consist of minute particles, almost entirely round, having a diameter varying between 0.75 and 3.0 microns. These particles are in rapid Brownian movement, closely resembling, therefore, the latex exudate from the Hevea rubber tree.

This latex dispersion from guayule varies in color from a pale, milky green when freshly prepared from green shrub to a milky brown in the case of older material. The green, milky latex from fresh shrub on standing in air will be found to change gradually in color to a pale brown. The fresh latex gradually creams on standing, but incompletely and without any appreciable coagulation taking place. In this way and by centrifugal means, I have succeeded in preparing from guayule shrub a concentrated latex, snow white in color, containing forty per cent. (40%) of coagulable rubber substance.

This artificial latex from guayule would appear to be much more stable towards coagulating agents than is the latex of Hevea. It is not readily coagulated by acid in the cold, but on heating, after acidifying, the rubber is completely separated as a more or less agglomerated mass which, by pressure applied in any way, is readily transformed into a dense, compact clot of rubber. This rubber clot when first prepared is white to pale brown in color, depending on the latex and time of heating but rapidly darkens on drying, unless suitable bleaching agents are applied to the latex before coagulation. The serum remaining is brown in color and darkens on standing in air or on boiling, becoming finally black. I have also observed that a very excellent rubber, pale in color and not prone to discoloration can be prepared by heating this guayule latex in the presence of dilute caustic alkali by means of steam under pressure. By this means the discoloring and objectionable impurities present in the latex are effectively destroyed before complete coagulation of the rubber is effected.

The rubber prepared from this guayule latex is a tough elastic product more nearly resembling plantation rubber than the guayule of present-day milling methods. Its acetone extract, based on analysis made of products prepared from the latex by different methods of coagulation, ranges between five per cent. (5%) and eight per cent. (8%), more or less. As above indicated, the rubber may be transparent and light in color or dark, according to the methods of treatment and coagulation employed. It is clean and free from all traces of fibre or dirt.

It will be readily understood by those in the art that antioxidants, accelerators, sulphur, other modifiers or inert materials as may be required for any given purpose may be added to this latex by the same methods and means as apply in the application of such materials to Hevea latex. As one example, I have found that by adding twenty-five hundredths per cent. (0.25%) of dimethylparaphenylenediamine to my concentrated latex before coagulation, the age-resisting and vulcanizing properties of the resulting rubber are improved.

In illustration of the way in which this process may be carried out and of the products therefrom, the following examples may be cited:

(A)

Six hundred (600) grams of freshly pulled, eight-year-old guayule plants, from which the leaves had been removed, were crushed with two thousand (2,000) c.c. of water to which monobasic phosphate, for example, monobasic sodium phosphate, and caustic soda had been added to maintain a pH of about 7.2 throughout. The crushed mass and liquor were transferred directly to a pebble mill and macerated therein by means of flint pebbles for one hour. By the end of that time, the lush plant fibre was thoroughly disintegrated. The green, milky latex was filtered from the fibre and water-insoluble materials which were afterward washed with five hundred (500) c.c. of fresh solution, which was added to the original latex. Twenty-four hundred (2400) c.c.—total latex prepared in this way, when just acidified by means of dilute sulphuric acid and boiled, threw down a mass of fine particles of rubber which, by filtration and pressure, formed a tough, elastic sheet of rubber. Washed and dried, this sheet weighed sixty-eight (68) grams, equivalent to a yield of twenty and six-tenths per cent. (20.6%) of rubber on the dry weight of the original shrub. The acetone-extract of this particular material was six and three-tenths per cent. (6.3%). It was at first brown in color, but darkened on drying. After six months' time, this rubber showed no "tackiness" and was in excellent condition.

(B)

Another one thousand (1000) gram sample of the same shrub, which had partially dried out, was crushed with two (2) litres of water to which the necessary caustic soda was added to give a pH of 7.2 by determination; thirty (30) grams of triethanolamine were also added before crushing the shrub to assist in the dispersion. The crushed shrub and liquor were milled for one hour, but as this was insufficient to disintegrate the fibre completely, milling was continued for one additional hour. There was no separation or "worming" of the rubber. The brownish, milky liquor was filtered through cheesecloth, and finally freed from all particles of fine bagasse, sand, etc., by passage through continuous centrifuge. The residues of bagasse, etc., were washed with fresh liquor, and centrifuged; and the washings were added to the original latex extract, resulting in three thousand (3000) c.c., total of dilute latex.

(1) Three hundred (300) c.c. of latex produced according to Example (B) were acidified with dilute sulphuric acid and heated. The color darkened, and on boiling a solid elastic clot of rubber floating in a dark brown liquor was obtained.

Dry weight of rubber_____grams__ 12.26
Acetone-extract thereof_____percent__ 7.6

(2) Another three hundred (300) c.c. of the same latex were digested in an autoclave with additional caustic alkali (NaOH) (to make one per cent.) for one hour at one hundred twenty degrees centigrade (120° C.). It "creamed" readily thereafter without coagulation. The thick, pure white cream which separated was washed by centrifugal means and coagulated by acidification and heating.

Dry weight_____grams__ 10.8
Acetone-extract thereof_____percent__ 5.0

This rubber was white and did not discolor appreciably on drying.

(3) Another three hundred (300) c.c. of the same latex were digested in an autoclave for one hour at one hundred twenty degrees centigrade (120° C.), the liquor containing one per cent. (1%) of caustic soda, as per example (2). This was "creamed" and thereafter washed by centrifugal means. The concentrated latex was coagulated by means of alcohol containing twenty-five hundredths per cent. (0.25%) of hydrochinon. The dry weight of rubber so produced amounted to ten and five-tenths (10.5) grams, and this rubber remained a pale brown and, after being in the light for six months, was still in good condition.

(C)

Two thousand (2000) grams of fresh, eight-year-old guayule plants, without leaves, were crushed in two lots of one thousand (1000) grams each, each lot being milled separately in the presence of centrifugal wash liquors from previous charges. In one case, enough strong ammonia water was added to the wash liquor to result in one (1) gram of ammonium hydroxide ($NH_4OH$) per one hundred (100) grams of liquor; and in the other case, thirty (30) grams of triethanolamine were added. In one experiment made in each instance the latex was separated from the plant fibres, etc., which were washed with fresh liquor, and the liquors and washings were combined, the volume thereof amount to three thousand (3000) c.c. This was acidified with dilute sulphuric acid and heated until the dispersed rubber separated completely as fine particles floating on a clear reddish brown mother liquor. These particles were filtered off, washed, soaked over night in a twenty-five hundredths per cent. (0.25%) solution of dimethylparaphenylenediamine and finally squeezed into one continuous sheet under pressure rolls. The weight of this dry sheet was two hundred forty-three (243) grams, and the acetone extract amounted to six and five tenths per cent. (6.5%). After two months this rubber was still in excellent physical condition. Vulcanized, to optimum cure, on a standard test formula containing one hundred (100) parts rubber, ten (10) parts zinc oxide, one and five-tenths (1.5) parts stearic acid, three (3) parts sulphur, with two (2) parts D. P. G., this rubber gave a breaking strength of forty-two hundred (4200) lbs. per square inch with an elongation at break of seven hundred twenty per cent. (720%).

To anyone skilled in the art, other means and dispersing agents will readily occur. I have used, for example, lecithin from soya beans, also various preparations made and sold under trade names for the purpose. Similarly, protective colloids may be added to the liquor before crushing and milling, but in the case of guayule the shrub itself appears to contain sufficient of these for practical purposes. Similarly, the coagulation of the resulting latex can be carried out by a number of steps or ways well known in the art in order to accomplish any given purpose.

Having described my invention, what I claim and desire to secure by Letters Patent is—

1. The process of recovering rubber from a rubber-bearing plant which does not respond to tapping comprising disintegrating said plant in the presence of a medium maintained at approximately the same hydrogen ion concentration as the fresh juice of the plant in fresh condition, whereby coagulation of the rubber content of the disintegrated plant is inhibited.

2. The process of recovering rubber from a rubber-bearing plant which does not respond to tapping comprising disintegrating said plant in the presence of an aqueous protective medium, the pH of said medium being about the same and maintained about the same as that of the fresh juice of the plant in fresh condition whereby coagulation of the rubber content of the disintegrated plant is inhibited.

3. The process of recovering rubber from a rubber-bearing plant which does not respond to tapping comprising disintegrating said plant in the presence of an aqueous protective medium, the pH of said medium being maintained by a buffer solution the same as that of fresh juice in fresh condition, or slightly higher.

4. The process of recovering rubber from a rubber-bearing plant which does not respond to tapping comprising disintegrating said plant in the presence of a protective aqueous dispersion medium including a buffer solution and a dispersion agent, the pH of said medium being about the same and maintained the same as that of fresh juice from said plant in fresh condition or slightly higher.

5. The process of recovering rubber from a rubber-bearing plant which does not respond to tapping comprising disintegrating the plant in the presence of an aqueous protective medium inhibiting coagulation of the resulting latex, said medium being maintained at a pH of about 7.2 or slightly higher.

6. The process of recovering rubber from a rubber-bearing plant which does not respond to tapping comprising disintegrating the plant in the presence of a neutral buffer solution in an amount sufficient to maintain a condition of substantial neutrality throughout and inhibiting coagulation of the rubber content of the disintegrated plant, separating the resulting latex dispersion, concentrating the latter, and subjecting the resulting latex concentrate to coagulation.

7. The process of recovering rubber from a rubber-bearing plant which does not respond to tapping comprising disintegrating a plant in the presence of an aqueous protective medium inhibiting coagulation of the resulting latex, separating the resulting latex dispersion from extracted solids, concentrating the latex dispersion, and treating said separated latex concentrate under pressure with steam in the presence of a dilute caustic alkali.

8. The process of recovering rubber from a rubber-bearing plant which does not respond to tapping comprising disintegrating a plant in the presence of an aqueous protective medium inhibiting coagulation of the resulting latex, separating the resulting latex dispersion from extracted solids, concentrating the latex dispersion, heating the latex concentrate in the presence of a dilute alkaline medium, and subsequently coagulating the so-treated latex.

DAVID SPENCE.